United States Patent
Wang et al.

(10) Patent No.: US 9,173,207 B2
(45) Date of Patent: Oct. 27, 2015

(54) METHOD AND DEVICE FOR CONFIGURING CELL PARAMETERS OF RELAY NODE

(75) Inventors: Xin Wang, Shenzhen (CN); Hengxing Zhai, Shenzhen (CN); Guanzhou Wang, Shenzhen (CN); Si Chen, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 100 days.

(21) Appl. No.: 13/824,823

(22) PCT Filed: Sep. 6, 2011

(86) PCT No.: PCT/CN2011/079393
§ 371 (c)(1),
(2), (4) Date: Mar. 18, 2013

(87) PCT Pub. No.: WO2012/062147
PCT Pub. Date: May 18, 2012

(65) Prior Publication Data
US 2013/0229946 A1    Sep. 5, 2013

(30) Foreign Application Priority Data

Nov. 8, 2010 (CN) .......................... 2010 1 0535957

(51) Int. Cl.
*H04W 72/04* (2009.01)
*H04W 24/02* (2009.01)
*H04W 16/26* (2009.01)
*H04W 84/04* (2009.01)

(52) U.S. Cl.
CPC .......... *H04W 72/0406* (2013.01); *H04W 24/02* (2013.01); *H04W 72/0426* (2013.01); *H04W 16/26* (2013.01); *H04W 84/047* (2013.01)

(58) Field of Classification Search
USPC ................ 370/254, 315, 328; 375/211; 455/7
See application file for complete search history.

(56) References Cited

U.S. PATENT DOCUMENTS

| | | | |
|---|---|---|---|
| 2010/0272009 A1 | 10/2010 | Cheng et al. | |
| 2012/0028631 A1* | 2/2012 | Chun et al. | 455/422.1 |
| 2012/0140703 A1* | 6/2012 | Kim et al. | 370/315 |
| 2012/0252436 A1* | 10/2012 | Ostrup et al. | 455/422.1 |
| 2013/0215820 A1* | 8/2013 | Redana et al. | 370/315 |
| 2014/0024306 A1* | 1/2014 | Redana et al. | 455/7 |

FOREIGN PATENT DOCUMENTS

| | | |
|---|---|---|
| CN | 101841934 A | 9/2010 |
| CN | 102378187 A | 3/2012 |
| WO | WO 2010124182 | 10/2010 |

OTHER PUBLICATIONS

International Search Report for PCT International Application No. PCT/CN2011/079393, mailed Dec. 15, 2011.

* cited by examiner

*Primary Examiner* — Edan Orgad
*Assistant Examiner* — Saumit Shah
(74) *Attorney, Agent, or Firm* — Pearl Cohen Zedek; Latzer Baratz LLP

(57) ABSTRACT

The disclosure claims a method and a device for configuring cell parameters of a Relay Node (RN), which can solve the technical problem that the cell parameters cannot be reasonably configured as a Donor eNB (DeNB) does not know the cell amount of the RN. In the disclosure, the RN sends the cell amount of cells which are managed by the RN to the DeNB via a control signaling, so as to make the DeNB more reasonably configure the cell parameters of the RN. The disclosure solves the problem that the DeNB cannot reasonably allocate resources according to the cell amount of the RN, and avoids resources conflicts, wherein the resources contain an Evolved Universal Terrestrial Radio Access Network (E-UTRAN) Cell Global Identifier (ECGI), a Physical Cell ID (PCI) and the like.

6 Claims, 4 Drawing Sheets

METHOD AND DEVICE FOR CONFIGURING CELL PARAMETERS OF RELAY NODE

CROSS-REFERENCE TO RELATED APPLICATIONS

This application is a National Phase Application of PCT International Application No. PCT/CN2011/079393, International Filing Date Sep. 6, 2011, claiming priority of Chinese Patent Application No. 201010535957.8, filed Nov. 8, 2010, which is hereby incorporated by reference.

FIELD OF THE INVENTION

The disclosure relates to the field of wireless communication technology, and in particular relates to a method and device for configuring cell parameters of a Relay Node (abbreviated as RN).

BACKGROUND OF THE INVENTION

In order to satisfy the increasing requirements of the large bandwidth high-speed mobile access, the Third Generation Partnership Projects (abbreviated as 3GPP) put forward a Long-Term Evolution advance (abbreviated as LTE-Advanced) standard. The LTE-Advanced reserves a core of a Long-Term Evolution (abbreviated as LTE) for the evolution of the LTE, and adopts a series of techniques to expand the frequency domain and the space domain based on the above, so as to realize the purpose of improving the utilization ratio of the spectrum, and increasing the system capacity and the like.

The Wireless Relay technique, namely, one of the LTE-Advanced techniques, aims at expanding the cell coverage area, reducing the blind angle (or dead angle) area in communication, balancing the load, transferring the service in the hotspot area, and saving the transmitting power of the User Equipment (abbreviated as UE). As shown in FIG. 1, the RN provides the functions and services similar with a normal eNB for the UE which is accessed to a cell of the RN, and then accesses an eNB which serves for the RN through a wireless interface in the similar mode of a normal UE; the eNB which serves for the RN is called as a Donor eNB (abbreviated as DeNB).

According to whether the RN has its own independent cells, or is taken as a part of a cell under the DeNB, a Type1 Relay and a Type2 Relay are respectively defined. The Type1 Relay refers that the RN can establish its own independent cells which have their own Physical Cell ID (abbreviated as PCI). The RN works as an eNB in its own cells, for example, transmitting reference signals, scheduling the UE, and the like. The Type2 Relay does not have its own independent cells and PCI, and is only used for assisting the DeNB to transmit data. Besides the Type1 Relay, a "Type1a" Relay and a "Type1 b" Relay are also defined in the standard, and are similar with the Type1 Relay in a cell establishment aspect; both the "Type1 a" Relay and the "Type1b Relay" have their own independent cells, and can independently receive and transmit control signals and perform the scheduling.

In view of the structure, the RN and the DeNB establish a unique S1 connection on the control plane, and the DeNB is taken as a unique Mobility Management Entity (abbreviated as MME), all the S1 signaling related to the UE will be transmitted to the DeNB through the S1 connection, the DeNB transmits the S1 signaling to a real MME destination on the S1 connection established by the DeNB and the MME. Similarly, the RN also only establishes a unique X2 connection with the DeNB, the X2 signaling between the RN and other eNBs must be forwarded through the DeNB.

It should be noted that, an Operation and Maintenance (abbreviated as OAM) of the RN cannot communicate with the OAM of the DeNB (for example, the two belong to different operators), thus, the cell parameters allocated by the OAM of the RN, such as an Evolved Universal Terrestrial Radio Access Network (E-UTRAN) Cell Global Identifier (abbreviated as ECGI), may conflict with the ECGI of the cell managed by the DeNB, namely, the uniqueness of the ECGI is lost. So, the cell parameters of the cell managed by the RN are allocated by the DeNB, but not by the OAM of the RN. Thereby, the DeNB needs to know the number of the cells managed by the RN before allocating the cell parameters for the RN.

SUMMARY OF THE INVENTION

For that reason, one main purpose of the disclosure is to provide a method and device for configuring cell parameters of a RN, for solving the technical problem that the DeNB cannot reasonably configure the cell parameters since the DeNB does not know the cell amount of the RN.

In order to achieve the purpose, the technical solution of the disclosure is realized below.

a method for configuring cell parameters of an RN, comprising: sending, by a RN, a control signaling which carries a cell amount of one or more serving cells of the RN to a Donor eNB, DeNB; configuring, by the DeNB, cell parameters of the one or more serving cells for the RN according to the cell amount contained in the control signaling.

Preferably, the cell parameters of the one or more serving cells configured for the RN by the DeNB comprise an ECGI and a PCI.

Preferably, the control signaling comprises at least one of the following: a RRC signaling, an S1 signaling and an X2 signalling.

The RRC signaling comprises at least one of the following: a RRC Connection Setup Request message, a RRC Connection Setup Complete message, a RRC Connection Reestablishment Request message, a RRC Connection Reestablishment Complete message and a RRC Connection Reconfiguration Complete message; the S1 signaling includes comprises at least one of the following: an S1 Setup Request message and an eNB Configuration Update message; the X2 signalling is an eNB Configuration Update message.

Preferably, sending, by the RN, the control signaling which carries the cell amount of the one or more serving cells of the RN to the DeNB comprises: before the RN establishes a RRC connection, or re-establishes a RRC connection, or performs a RRC connection reconfiguration, or establishes an S1 connection with the DeNB, sending by the RN the control signaling which carries the cell amount of the one or more serving cells of the RN to the DeNB; and when the RN has a RRC connection, or an S1 connection, or an X2 connection with the DeNB, and the cell amount of the one or more serving cells of the RN is increased, sending, by the RN, the control signaling which carries the cell amount of the one or more serving cells of the RN to the DeNB.

According to the method of the disclosure, the disclosure also provides a device for configuring cell parameters of a RN, comprising a RN and a DeNB, wherein, the RN is further configured to send a control signaling which carries a cell amount of one or more serving cells of the RN to the DeNB; the DeNB is further configured to configure cell parameters of the one or more serving cells for the RN according to the cell amount contained in the control signaling.

Preferably, before the RN establishes a RRC connection, or re-establishes a RRC connection, or performs a RRC connection reconfiguration, or establishes an S1 connection with the DeNB, the RN is configured to send the control signaling which carries the cell amount of the one or more serving cells of the RN to the DeNB; and when the RN has a RRC connection, or an S1 connection, or an X2 connection with the DeNB, and the cell amount of the one or more serving cells of the RN is increased, the RN is further configured to send the control signaling which carries the cell amount of the one or more serving cells of the RN to the DeNB.

In the disclosure, the RN sends the cell amount of the cell which are managed by the RN to the DeNB through the control signaling, so as to make the DeNB more reasonably configure the cell parameters of the RN. The disclosure solves the problem that the DeNB cannot reasonably distribute resources according to the cell number of the RN, and avoids resources conflicts, wherein the resources contain the ECGI, PCI and the like.

DETAILED DESCRIPTION OF THE EMBODIMENTS

In order to make the purpose, the technical proposal and the advantage of the disclosure more clear, the disclosure is further described in details with reference to the embodiments and drawings below.

Before a DeNB distributes cell parameters of a serving cell of a RN for the RN, the RN needs to send a control signaling which carries a cell amount of one or more serving cell(s) of the RN to the DeNB; the DeNB configures the cell parameters of the RN according to the cell amount contained in the signaling.

The control signaling includes at least one of the following: a RRC signaling, an S1 signaling and an X2 signaling.

The RRC signaling includes at least one of the following: a RRC Connection Setup Request message (RRCConnectionRequest), a RRC Connection Setup Complete message (RRCConnectionSetupComplete), a RRC Connection Reestablishment Request message (RRCConnectionReestablishmentRequest), a RRC Connection Reestablishment Complete message (RRCConnectionReestablishmentComplete) and a RRC Connection Reconfiguration Complete message (RRCConnectionReconfigurationComplete).

The S1 signaling includes at least one of the following: an S1 Setup Request message (S1 SETUP REQUEST) and an eNB Configuration Update message (eNB CONFIGURATION UPDATE).

The X2 signaling includes the eNB Configuration Update message.

The step of configuring the cell parameters of the RN by the DeNB includes at least one of the following: configuring or reconfiguring the cell parameters, such as ECGI and PCI, of the servicing cell(s) of the RN for the RN by the DeNB.

The disclosure is further described in details with reference to the embodiments and drawings below.

Embodiment 1

If the RN has acquired the cell amount of the serving cell(s) of the RN (the cell amount can be preconfigured, or can be allocated by the OAM of the RN) before the RN establishes or re-establishes the RRC connection with the DeNB, the RN can send a RRC message which contains the cell amount of the serving cell(s) of the RN to the DeNB during the process of establishing or re-establishing the RRC connection, and thus the cell amount of one or more cell(s) managed by the RN is reported to the DeNB, so as to make the DeNB more reasonably configure the cell parameters of the RN.

Figure 1:
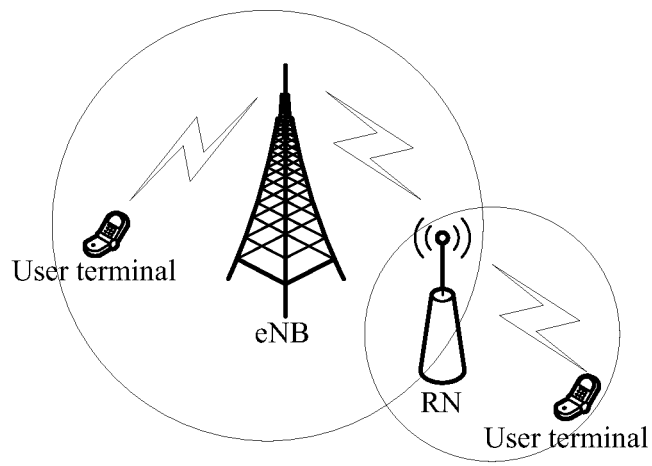
FIG. 1 shows a diagram of a network structure using a Wireless Relay technique.
Figure 2:
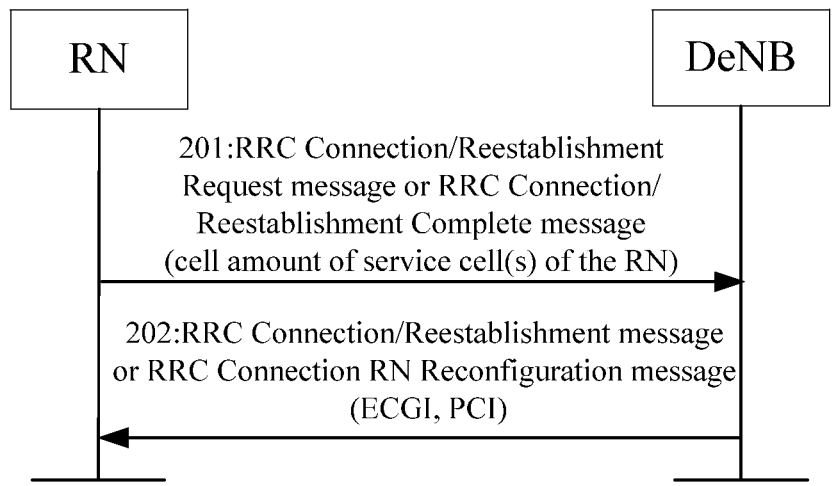
FIG. 2 shows a flow chart of a preferred embodiment 1 according to the disclosure.

The steps are as shown in FIG. 2:

Step 201: during the process of establishing or re-establishing the RRC connection between the RN and the DeNB, the RN reports the cell amount of the cell(s) managed by the RN by sending a RRC message which contains the cell amount of the serving cell(s) of the RN to the DeNB.

The RRC message can be the RRCConnectionRequest message, the RRCConnectionSetupComplete message, the RRCConnectionReestablishmentRequest message, and the RRCConnectionReestablishmentComplete message.

Step 202: after the DeNB successfully receives the RRC message which carries the cell amount, the DeNB reasonably configures the ECGI and the PCI for the serving cell(s) of the RN according to the cell amount. If current environment and the available resources owned by the DeNB allow the RN to establish cells as many as the RN can support, the DeNB allocates cell parameters, which correspond to the cell amount, for the RN; otherwise, the allocated cell parameters may be smaller than the cell amount.

The message replied to the RN from the DeNB can be a RRC Connection Setup (RRCConnectionSetup) message, a RRC Connection Reestablishment (RRCConnectionReestablishment) message, or a RRC Connection RN Reconfiguration (RRCConnectionRNReconfiguration) message.

Embodiment 2

If the RN has acquired the cell amount of the serving cell(s) of the RN (the cell amount can be preconfigured, or can be allocated by the OAM of the RN) before the RN performs the RRC connection reconfiguration with the DeNB, the RN also can send an RRC message which contains the cell amount of the serving cell of the RN to the DeNB during the process of the RRC connection reconfiguration, and thus the cell amount of the cell(s) managed by the RN is reported to the DeNB, so as to make the DeNB more reasonably configure the cell parameters of the RN.

Figure 3:
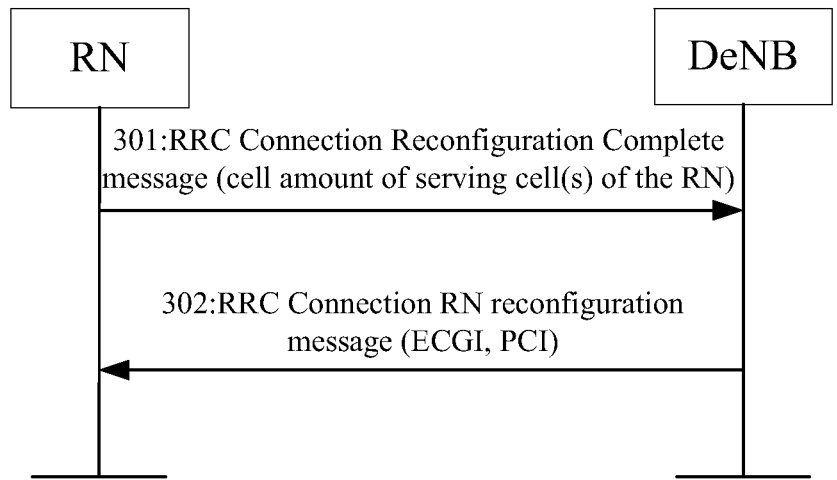
FIG. 3 shows a flow chart of a preferred embodiment 2 according to the disclosure.

The steps are as shown in FIG. 3:

Step 301: during the process of the RRC connection reconfiguration between the RN and the DeNB, the RN reports the cell amount of the cell(s) managed by the RN by sending a RRC message which contains the cell amount of the serving cell(s) of the RN to the DeNB.

The RRC message can be the RRCConnectionReconfigurationComplete message.

Step 302: after the DeNB successfully receives the RRC message which carries the cell amount, the DeNB reasonably configures the ECGI and the PCI for the serving cell(s) of the RN according to the cell amount. If current environment and available resources owned by the DeNB allows the RN to establish cells as many as the RN can support, the DeNB allocates the cell parameters, which correspond to the cell amount, for the RN; otherwise, the allocated cell parameters may be smaller than the cell amount. The message replied to the RN from the DeNB can be a RRC Connection RN Reconfiguration (RRCConnectionRNReconfiguration) message.

Embodiment 3

If an RRC connection has existed between the RN and the DeNB, and the cell amount of the serving cell(s) is increased, then the RN can send a RRC message which carries the cell amount of the serving cell(s) to the DeNB, and thus the cell amount of the cell(s) managed by the RN is reported to the DeNB, so as to make the DeNB more reasonably configure the cell parameters of the RN.

Figure 4:
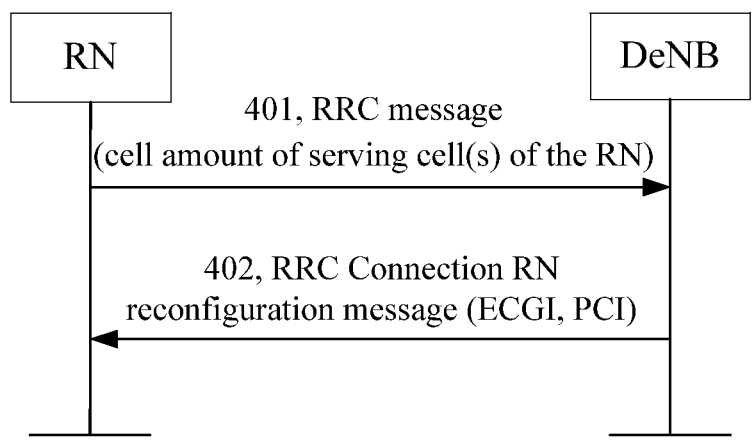
FIG. 4 shows a flow chart of a preferred embodiment 3 according to the disclosure.

The steps are as shown in FIG. 4:

Step 401: after the cell amount of the serving cell(s) of the RN is changed, the RN can send a RRC message which carries the cell amount of the serving cell(s) of the RN to the DeNB to report the cell amount of the cell(s) currently managed by the RN, wherein this amount can be the number of added cell(s), and also can be updated complete number.

Step 402: after the DeNB successfully receives the RRC message which carries the cell amount, the DeNB reasonably configures the ECGI and the PCI for the serving cell(s) of the RN according to the cell amount. If current environment and available resources owned by the DeNB allows the RN to establish cells as many as the RN can support, the DeNB allocates the cell parameters, which correspond to the cell number, for the RN; otherwise, the allocated cell parameters may be smaller than the cell amount. The message replied to the RN from the DeNB can be a RRC Connection RN Reconfiguration (RRCConnectionRNReconfiguration) message.

Embodiment 4

If the RN has acquired the cell amount of the serving cell(s) of the RN (the cell amount can be preconfigured, or can be allocated by the OAM of the RN) before the RN establishes an S1 connection with the DeNB, the RN can send an S1 message which contains the cell amount of the serving cell(s) of the RN to the DeNB during the process of establishing the S1 connection, and thus the cell amount of the cell(s) managed by the RN is reported to the DeNB, so as to make the DeNB more reasonably configure the cell parameters of the RN.

Figure 5:
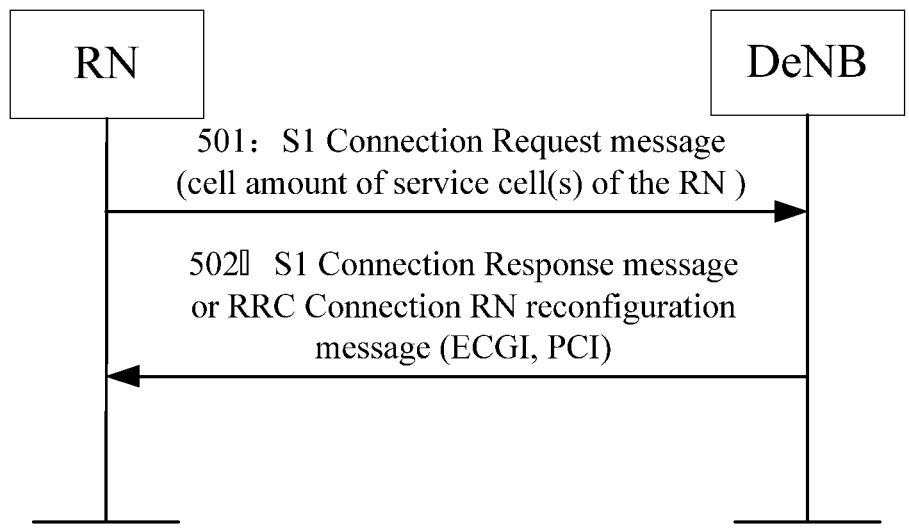
FIG. 5 shows a flow chart of a preferred embodiment 4 according to the disclosure.

The steps are as shown in FIG. 5:

Step 501: during the process of establishing the S1 connection between the RN and the DeNB, the RN reports the cell amount of the cell(s) managed by the RN by sending an S1 message which contains the cell amount of the serving cell(s) of the RN to the DeNB.

The S1 message can be an S1 Setup Request (S1SetupRequest) message.

Step 502: after the DeNB successfully receives the S1 message which carries the cell amount, the DeNB reasonably configures the ECGI and the PCI for the serving cell(s) of the RN according to the cell amount. If current environment and available resources owned by the DeNB allows the RN to establish cells as many as the RN can support, the DeNB allocates the cell parameters, which correspond to the cell amount, for the RN; otherwise, the allocated cell parameters may be smaller than the cell amount. The message replied to the RN from the DeNB can be an S1 Setup Response (S1SetupResponse) message or a RRC Connection RN Reconfiguration (RRCConnectionRNReconfiguration) message.

Embodiment 5

If an S1 connection has existed between the RN and the DeNB, and the cell amount of the serving cell(s) of the RN is increased, then the RN can send an S1 message which carries the cell amount of the serving cell(s) to the DeNB, and thus the cell amount of the cell(s) managed by the RN is reported to the DeNB, so as to make the DeNB more reasonably configure the cell parameters of the RN.

Figure 6:
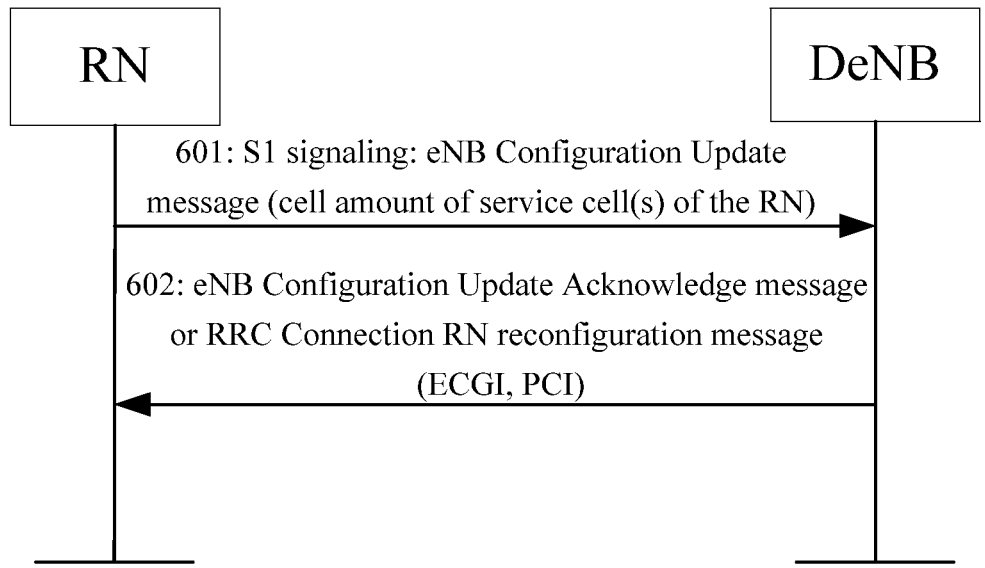
FIG. 6 shows a flow chart of a preferred embodiment 5 according to the disclosure.

The steps are as shown in FIG. 6:

Step 601: after the cell amount of the service cell(s) of the RN is changed, the RN can send an S1 message which carries the cell amount of the serving cell(s) of the RN to the DeNB to report the cell amount of the cell(s) currently managed by the RN, wherein this amount can be the number of added cell(s), and also can be a updated complete number.

The S1 message can be an eNB Configuration Update (eNB CONFIGURATION UPDATE) message.

Step 602: after the DeNB successfully receives the S1 message which carries the cell amount, the DeNB reasonably configures the ECGI and the PCI for the serving cell(s) of the RN according to the cell amount. If current environment and available resources owned by the DeNB allows the RN to establish cells as many as the RN can support, the DeNB allocates the cell parameters, which correspond to the cell amount, for the RN; otherwise, the allocated cell parameters may be smaller than the cell amount.

The message replied to the RN from the DeNB can be an eNB Configuration Update Acknowledge (eNB CONFIGURATION UPDATE ACKNOWLEDGE) message or a RRC Connection RN Reconfiguration (RRCConnectionRNReconfiguration) message.

Embodiment 6

If an X2 connection has existed between the RN and the DeNB, and the cell amount of the serving cell(s) is increased, then the RN can send an X2 message which carries the cell amount of the serving cell(s) to the DeNB, and thus the cell amount of the cells managed by the RN is reported to the DeNB, so as to make the DeNB more reasonably configure the cell parameters of the RN.

Figure 7:
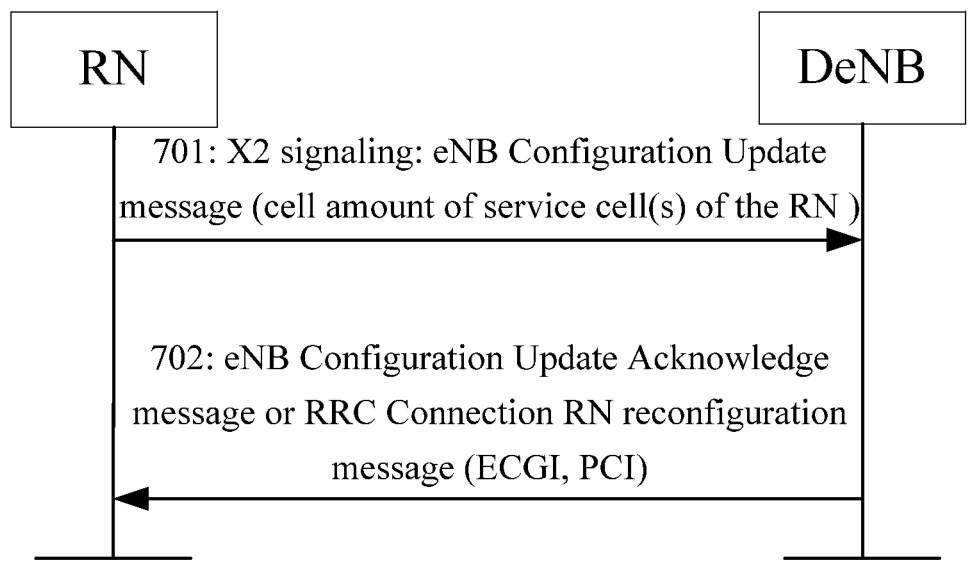
FIG. 7 shows a flow chart of a preferred embodiment 6 according to the disclosure.

The steps are as shown in FIG. 7:

Step 701: after the cell amount of the service cell(s) of the RN is changed, the RN can send an X2 message which carries the cell amount of the serving cell(s) of the RN to the DeNB to report the cell amount of the cell(s) currently managed by the RN, wherein this amount can be the number of added cell(s), and also can be updated complete number.

The X2 message can be an eNB Configuration Update (eNB CONFIGURATION UPDATE) message.

Step 702: after the DeNB successfully receives the X2 message which carries the cell amount, the DeNB reasonably configures the ECGI and the PCI for the serving cell(s) of the RN according to the cell number. If current environment and available resources owned by the DeNB allows the RN to establish cells as many as the RN can support, the DeNB allocates the cell parameters, which correspond to the cell amount, for the RN; otherwise, the allocated cell parameters may be smaller than the cell amount.

The message replied to the RN from the DeNB can be an eNB Configuration Update Acknowledge (eNB CONFIGURATION UPDATE ACKNOWLEDGE) message or a RRC Connection RN Reconfiguration (RRCConnectionRNReconfiguration) message.

Certainly, the disclosure may have various other embodiments; in the case of obeying the spirits and nature of the disclosure, those skilled in the art can make various corresponding changes and deformations according to the disclosure; and all the corresponding changes and deformations shall fall within the protection range of the attached claims of the disclosure.

The above is only the preferred embodiment of the disclosure and not intended to limit the disclosure.

INDUSTRIAL APPLICABILITY

In the disclosure, the RN sends the cell amount of the cell which are managed by the RN to the DeNB through the control signaling, so as to make the DeNB more reasonably configure the cell parameters of the RN cells. The disclosure solves the problem that the DeNB cannot reasonably allocate resources according to the cell number of the RN, and avoids resources such as ECGI, PCI conflicts.

What is claimed is:

1. A method for configuring cell parameters of a Relay Node, RN, comprising:
    sending, by a RN, a control signaling which carries a number representing how many cells that the RN is serving to a Donor eNB, DeNB; and
    configuring, by the DeNB, cell parameters for the cells that the RN is serving according to the number contained in the control signaling;
    wherein the cell parameters configured by the DeNB comprise an Evolved Universal Terrestrial Radio Access Network Cell Global Identifier, ECGI, and a Physical Cell ID, PCI;
    wherein sending, by the RN, the control signaling which carries the number representing how many cells the RN is serving to the DeNB comprises:
    before the RN establishes a Radio Resource Control, RRC, connection, or re-establishes a RRC connection, or performs a RRC connection reconfiguration, or establishes an S1 connection with the DeNB, sending by the RN the control signaling which carries the number representing how many cells the RN is serving to the DeNB; and
    when the RN has a RRC connection, or an S1 connection, or an X2 connection with the DeNB, and the number representing how many cells the RN is serving is increased, sending, by the RN, the control signaling which carries the number representing how many cells the RN is serving to the DeNB.

2. The method according to claim 1, wherein the control signaling comprises at least one of the following: a Radio Resource Control, RRC, signaling, an S1 signaling and an X2 signaling.

3. The method according to claim 2, wherein
    the RRC signaling comprises at least one of the following: a RRC Connection Setup Request message, a RRC Connection Setup Complete message, a RRC Connection Reestablishment Request message, a RRC Connection Reestablishment Complete message and a RRC Connection Reconfiguration Complete message;
    the S1 signaling comprises at least one of the following: an S1 Setup Request message and an eNB Configuration Update message; and
    the X2 signaling is an eNB Configuration Update message.

4. A device for configuring cell parameters of a RN, comprising a RN and a DeNB, wherein
    the RN is configured to send a control signaling which carries a number representing how many cells the RN is serving to the DeNB;
    the DeNB is configured to configure cell parameters for the cells that the RN is serving according to the number contained in the control signaling;
    wherein the cell parameters configured by the DeNB comprise an Evolved Universal Terrestrial Radio Access Network Cell Global Identifier, ECGI, and a Physical Cell ID, PCI;
    wherein before the RN establishes a Radio Resource Control, RRC, connection, or re-establishes a RRC connection, or performs a RRC connection reconfiguration, or establishes an Si connection with the DeNB, the RN is configured to send the control signaling which carries the number representing how many cells that the RN is serving to the DeNB; and
    wherein when the RN has a RRC connection, or an S1 connection, or an X2 connection with the DeNB, and the number representing how many cells the RN is serving is increased, the RN is further configured to send the control signaling which carries the number representing how many cells the RN is serving to the DeNB.

5. The device according to claim 4, wherein the control signaling comprises at least one of the following: a RRC signaling, an S1 signaling and an X2 signaling.

6. The device according to claim 5, wherein
    the RRC signaling comprises at least one of the following: a RRC Connection Setup Request message, a RRC Connection Setup Complete message, a RRC Connection Reestablishment Request message, a RRC Connection Reestablishment Complete message and a RRC Connection Reconfiguration Complete message;
    the S1 signaling comprises at least one of the following: an S1 Setup Request message and an eNB Configuration Update message;
    the X2 signaling is an eNB Configuration Update message.

* * * * *